United States Patent
Agarwal et al.

(10) Patent No.: US 10,192,433 B1
(45) Date of Patent: Jan. 29, 2019

(54) TRAFFIC CONTROL SYSTEM

(71) Applicant: Delphi Technologies, LLC, Troy, MI (US)

(72) Inventors: Divya Agarwal, Sunnyvale, CA (US); Michael H. Laur, Mission Viejo, CA (US); Brian R. Hilnbrand, Mountain View, CA (US)

(73) Assignee: Delphi Technologies, LLC, Troy, MI (US)

( * ) Notice: Subject to any disclaimer, the term of this patent is extended or adjusted under 35 U.S.C. 154(b) by 0 days.

(21) Appl. No.: 15/897,639

(22) Filed: Feb. 15, 2018

Related U.S. Application Data

(60) Provisional application No. 62/627,401, filed on Feb. 7, 2018.

(51) Int. Cl.
*G08G 1/07* (2006.01)
*G08G 1/01* (2006.01)

(52) U.S. Cl.
CPC ............. *G08G 1/0145* (2013.01); *G08G 1/07* (2013.01)

(58) Field of Classification Search
CPC ................................ G08G 1/00; B60W 10/00
See application file for complete search history.

(56) References Cited

U.S. PATENT DOCUMENTS

| | | | | |
|---|---|---|---|---|
| 2010/0309023 | A1* | 12/2010 | Busch | G08G 1/07 340/917 |
| 2011/0304476 | A1* | 12/2011 | Johnson | G08G 1/081 340/906 |
| 2015/0213713 | A1* | 7/2015 | Taylor | G08G 1/087 340/906 |

* cited by examiner

*Primary Examiner* — Shirley Lu
(74) *Attorney, Agent, or Firm* — Lawrence D. Hazelton

(57) ABSTRACT

A traffic control system includes a detector and controller-circuits. The detector is configured to detect a traffic-state characterized as inhibiting traffic-flow. A first-controller-circuit is configured to communicate with the detector and a traffic-signal. The traffic-signal is configured to control traffic-flow through an intersection, wherein the first-controller-circuit sends a request to the traffic-signal to operate to a signal-state that changes the traffic-state.

12 Claims, 4 Drawing Sheets

TRAFFIC CONTROL SYSTEM

TECHNICAL FIELD OF INVENTION

This disclosure generally relates to a traffic control system, and more particularly relates to a traffic control system that changes a traffic-state.

BRIEF DESCRIPTION OF DRAWINGS

The present invention will now be described, by way of example with reference to the accompanying drawings, in which.

DETAILED DESCRIPTION

Figure 1:
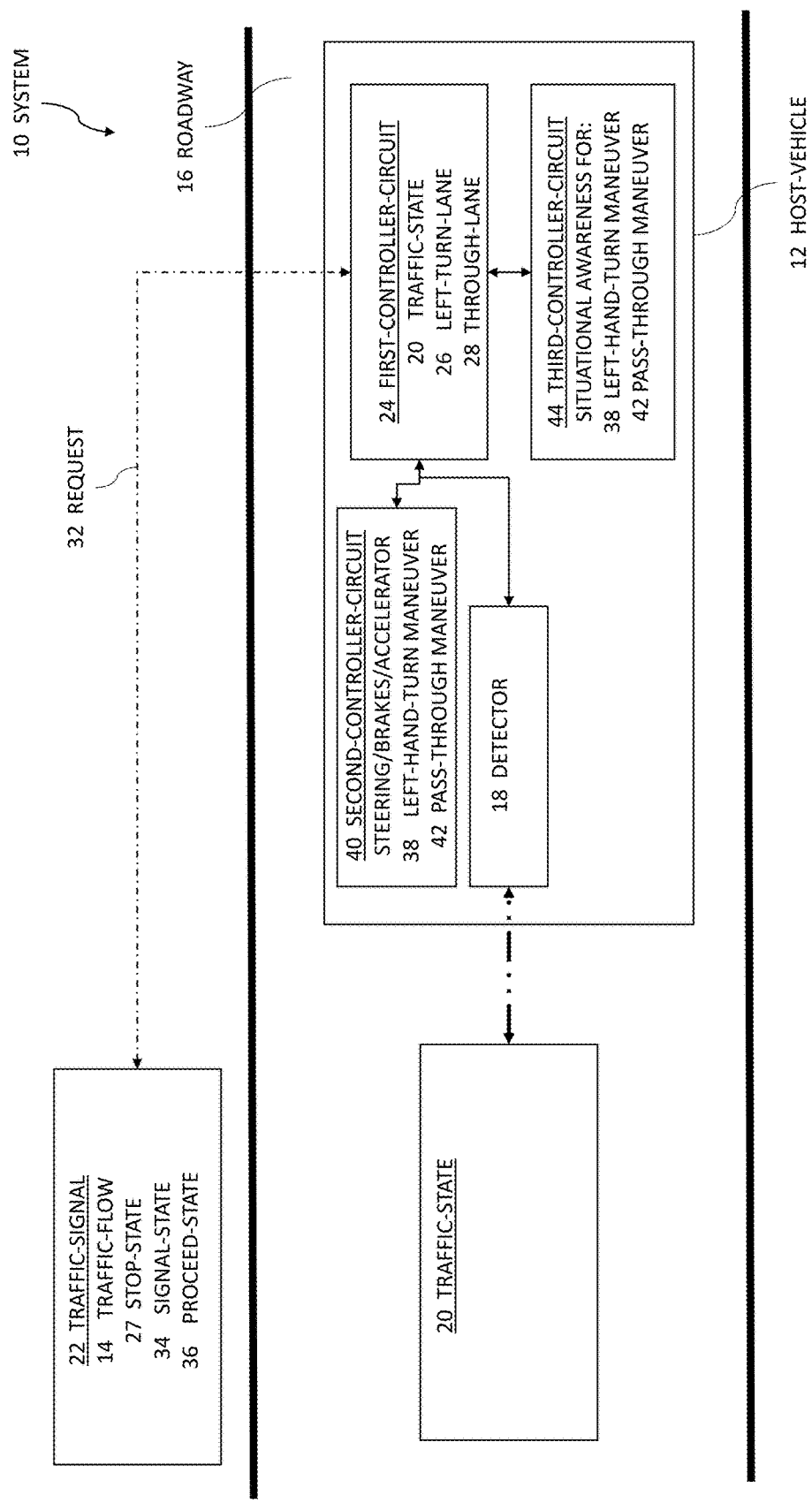
FIG. 1 is an illustration of a traffic control system in accordance with one embodiment.

FIG. 1 illustrates a non-limiting example of a traffic control system 10, hereafter referred to as the system 10, installed on a host-vehicle 12. As will be described in more detail below, the system 10 in an improvement over other traffic control systems because the system 10 changes a traffic-state 20 on a roadway 16.

The system 10 includes a detector 18 configured to detect the traffic-state 20 proximate to the host-vehicle 12 where the traffic-state 20 is characterized as inhibiting traffic-flow 14. As used herein, inhibiting traffic-flow 14 includes any scenario where traffic is moving at speeds below posted speed limits (e.g. less than 60%). In the example illustrated in FIG. 1, the detector 18 is a camera mounted on the host-vehicle 12. In other embodiments contemplated, but not shown, the camera may be remotely mounted to a traffic-infrastructure, such as a traffic-signal 22 or a lamp-post, and in communication with the host-vehicle 12. In yet another embodiment (not shown), the detector 18 may be a ranging-sensor, such as a radar and/or a lidar mounted to the host-vehicle 12 or remotely mounted and in communication with the host-vehicle 12. The detector 18 may detect indications from the traffic-signal 22, such as a color of an illuminated lamp, a position of the illuminated lamp on the traffic-signal 22, or a feature of the illuminated lamp (e.g. an arrow shape or lettering) that indicate the a right-of-way. In additional embodiments, the host-vehicle 12 receives wireless communication(s) from the traffic-signal 22 indicating the current state of the traffic-signal 22, e.g., a color of an illuminated lamp or a feature of the illuminated lamp (e.g. an arrow shape or lettering) that indicate the right-of-way.

The system 10 also includes a first-controller-circuit 24 configured to communicate with the detector 18 and the traffic-signal 22. The detector 18 may be hard-wired to the first-controller-circuit 24 in the host-vehicle 12 or may communicate through a wireless connection. The first-controller-circuit 24 may communicate with the traffic-signal 22 using any communication protocol including, but not limited to, dedicated short-range communications (DSRC), or other protocols that conform to standards such as IEEE 1609, SAE J2735, SAE J2945, or Cellular Vehicle-to-Everything ("V2X").

Figure 2:
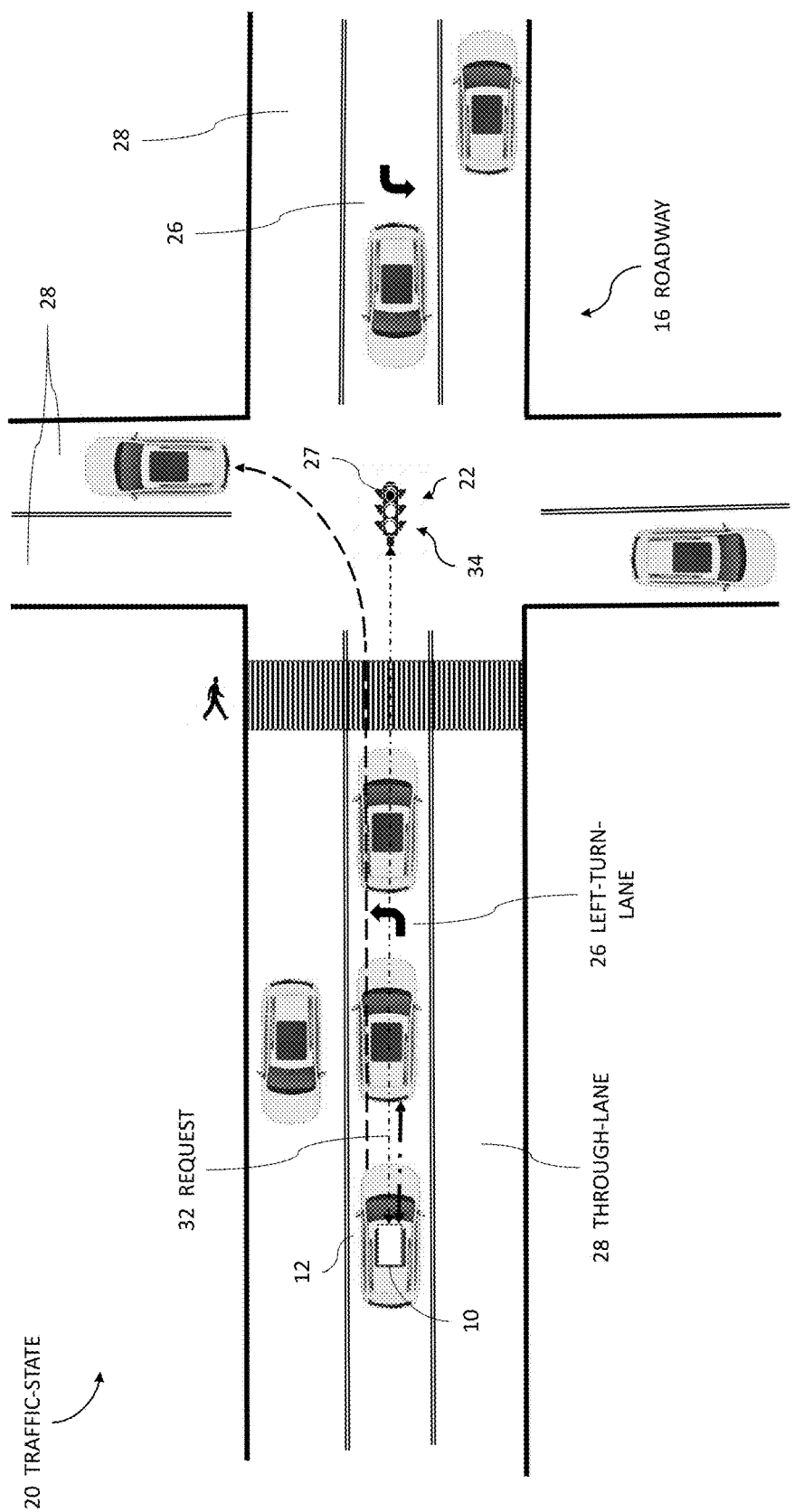
FIG. 2 is an illustration of a traffic-state in accordance with one embodiment.

FIG. 2 illustrates an example of one embodiment of the present invention. In the example, the traffic-state 20 includes a group of three vehicles stopped at an intersection in a left-turn-lane 26. While the host-vehicle 12 is the last vehicle in the group of three vehicles the detector 18 detects the traffic-signal 22 operating in a stop-state 27, as well as detecting the other vehicles ahead of the host-vehicle 12. The traffic-signal 22 is elevated above the center of the intersection and is configured to control traffic-flow 14 through the intersection. The traffic-signal 22 alternates the traffic-flow 14 between intersecting through-lanes 28 and/or turn-lanes (i.e. left-turn-lanes 26 and/or right-turn-lanes (not specifically shown) depending on the local traffic laws) as will be described in more detail below. The traffic-signal 22 may be a conventional traffic-light that includes colored lamps or other indicia that accord the right-of-way to vehicles and/or pedestrians as well as a traffic-light capable of wirelessly communicating with at least the host-vehicle 12.

In the example illustrated in FIG. 2, the first-controller-circuit 24 requests 32 the traffic-signal 22 to operate in a proceed-state 36 until the host-vehicle 12 proceeds through the intersection by executing a left-hand-turn maneuver 38. Once the first-controller-circuit 24 determines that the host-vehicle 12 has completed the left-hand-turn maneuver 38, the first-controller-circuit 24 may request 32 the traffic-signal 22 to return to its normal operating condition.

The system 10 may also include a second-controller-circuit 40 that is configured to operate the host-vehicle 12 in an automated mode characterized by the second-controller-circuit 40 steering the host-vehicle 12. As will be appreciated, first-controller-circuit 24 and second-controller circuit 40 may be separate circuitry, be the same circuitry, subsystems of one another, or any combination thereof. As also will be appreciated, the functions performed by first-controller-circuit 24 and second-controller circuit 40 may be handled by each individual controller-circuit or distributed between the two, e.g., load balancing. As used herein, the term automated-mode is not meant to suggest that fully automated or autonomous operation of the host-vehicle 12 is required. It is contemplated that the teachings presented herein are applicable to instances where the host-vehicle 12 is entirely manually operated by a human and the automation is merely providing emergency vehicle controls to the human. The second-controller-circuit 40 may steer the host-vehicle 12 in the automated mode executing the left-hand-turn maneuver 38 through the intersection as described above.

Figure 3:
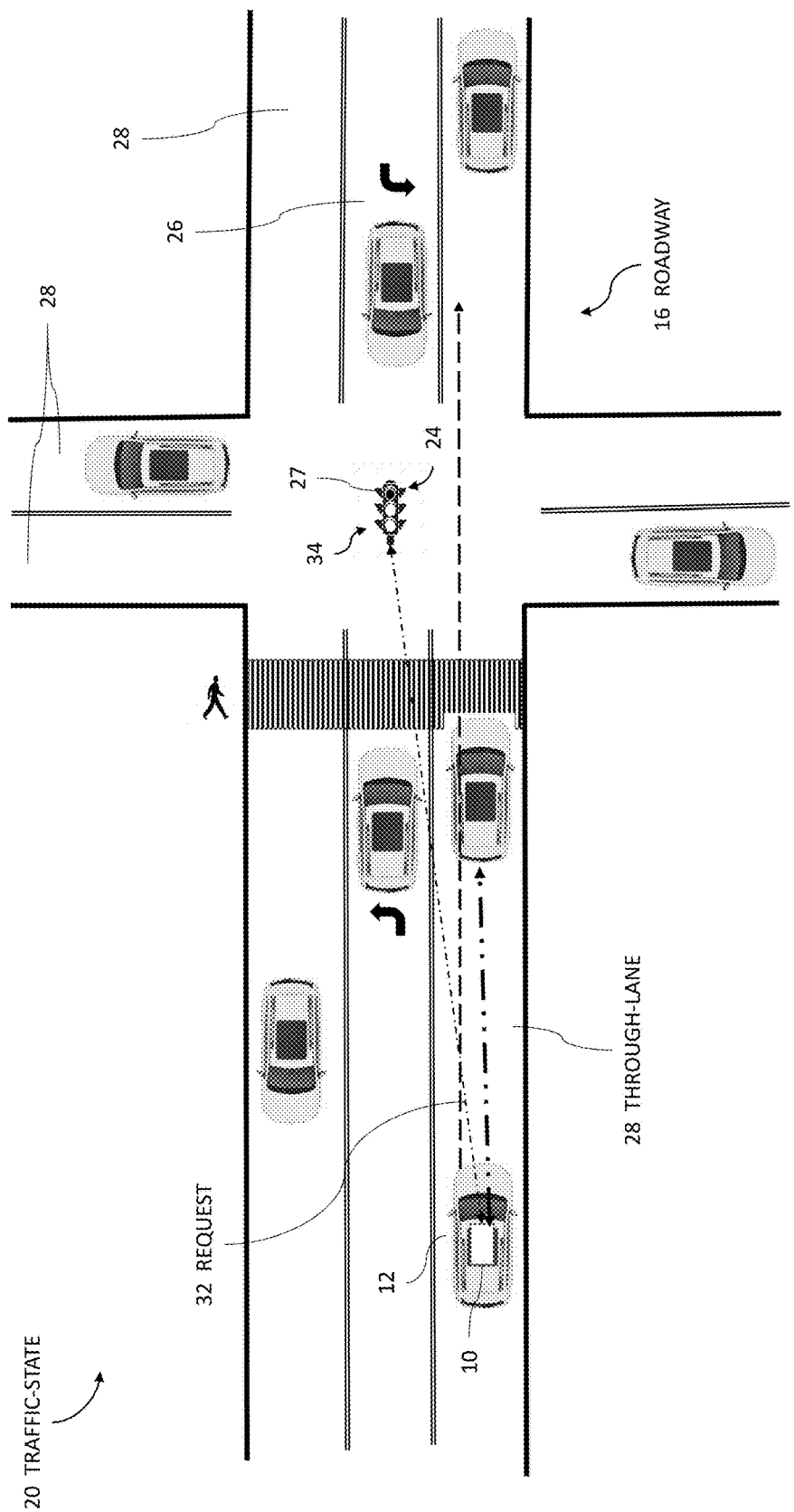
FIG. 3 is an illustration of another traffic-state in accordance with one embodiment.

FIG. 3 illustrates an example of one embodiment of the present invention—the example includes the traffic-state 20 where the detector 18 detects the host-vehicle 12 approaching the traffic-signal 22 (i.e. driving toward the intersection) and another vehicle stopped at the traffic-signal 22. The host-vehicle 12 and the other-vehicle are in a same through-lane 28. The detector 18 detects the traffic-signal 22 operating in the stop-state 27 for traffic-flow 14 traveling in the same direction as the host-vehicle 12. The first-controller-circuit 24 sends the request 32 to operate the traffic-signal 22 in the proceed-state 36 until the host-vehicle 12 proceeds through the intersection by executing a pass-through maneuver 42. Once the first-controller-circuit 24 determines that the host-vehicle 12 has completed the pass-through maneuver 42, the first-controller-circuit 24 may request 32 the traffic-signal 22 to return to its normal operating condition. The second-controller-circuit 40 may also steer the host-vehicle 12 in the automated mode executing the pass-through maneuver 42 through the intersection as described above. As will be appreciated, first-controller-circuit 24 and second-controller circuit 40 may be separate circuitry, be the same circuitry, subsystems of one another, or any combination thereof. As also will be appreciated, the functions performed by first-controller-circuit 24 and second-controller circuit 40 may be handled by each individual controller-circuit or distributed between the two, e.g., load balancing.

There may exist situations at intersections where the traffic-signal 22 is unable to communicate with the first-controller-circuit 24, due to equipment limitations of the traffic-infrastructure or other communications-related issues. In such situations, the first-controller-circuit 24 determines whether the traffic-signal 22 indicates the stop-state 27 and a third-controller-circuit 44 determines whether the left-hand-turn maneuver 38 (or the pass-through maneuver 42) can be completed without colliding with or impeding other traffic. The third-controller-circuit 44 may use data from the detector 18 and/or other sensors in communication with the system 10 to determine the local vehicle and pedestrian traffic in proximity to the intersection. The other sensors may be installed on the host-vehicle 12, on another vehicle, or may be part of the traffic-infrastructure, and may communicate using any communication protocol including, but not limited to, dedicated short-range communications (DSRC), or other protocols that conform to standards such as IEEE 1609, SAE J2735, SAE J2945, or Cellular V2X. In accordance with the determination by the third-controller-circuit 44 that the left-hand-turn maneuver 38 (or the pass-through maneuver 42) can be completed without colliding with or impeding other traffic, the second-controller-circuit 40 may steer the host-vehicle 12 executing the left-hand-turn maneuver 38 (or the pass-through maneuver 42) through the intersection. The first-controller-circuit 24 may communicate to other vehicles and/or the traffic-infrastructure the intent to perform the left-hand-turn maneuver 38 (or the pass-through maneuver 42) without the traffic-signal 22 according the right-of-way to the host-vehicle 12. This communication may inform the other vehicles of the event and alert the other vehicles not to follow the host-vehicle 12, as it is not uncommon for drivers of non-automated vehicles to follow a lead-vehicle through an intersection without the drivers visually checking for approaching cross-traffic.

The first-controller-circuit 24, the second-controller-circuit 40, and the third-controller-circuit 44 (hereafter referred to collectively as the "controller-circuits") may include a processor (not shown) such as a microprocessor or other control circuitry such as analog and/or digital control circuitry including an application specific integrated circuit (ASIC) for processing data as should be evident to those in the art. The controller-circuits may include a memory (not specifically shown), including non-volatile memory, such as electrically erasable programmable read-only memory (EEPROM) for storing one or more routines, thresholds, and captured data. The one or more routines may be executed by the processors to perform steps for determining if the traffic-state 20 exists based on signals received by the first-controller-circuit 24 from the detector 18, as described above. The controller-circuits may be distributed throughout the host-vehicle 12 and communicate with one another through a vehicle wiring harness, or may be housed in a common enclosure. As will be appreciated, the controller-circuits may be separate circuitry, be the same circuitry, subsystems of one another, or any combination thereof. As also will be appreciated, the functions performed by the controller-circuits may be handled by each individual controller-circuit or distributed between the three, e.g., load balancing.

Figure 4:
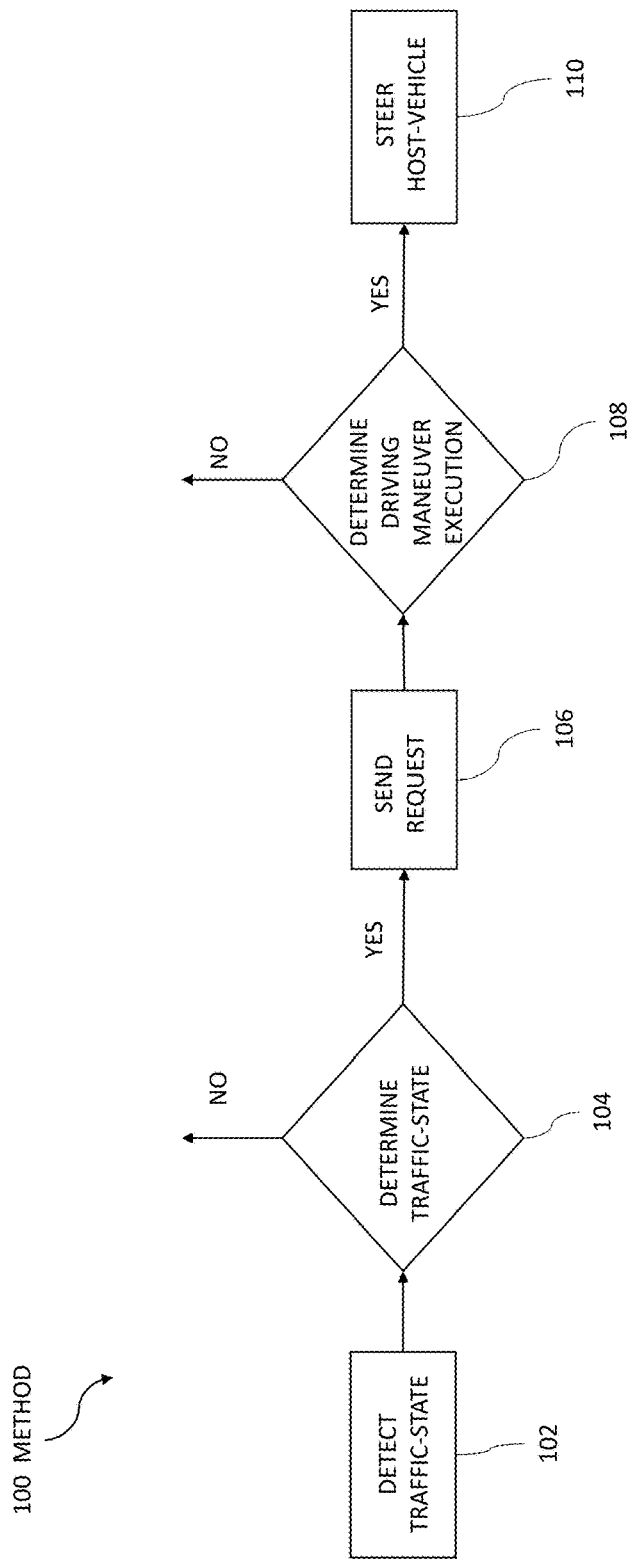
FIG. 4 is a flowchart illustrating a traffic control method in accordance with one embodiment.

FIG. 4 illustrates another embodiment of a traffic control method 100. The traffic control method 100 is an improvement over other traffic control methods because the traffic control method 100 changes a traffic-state 20 on a roadway 16.

Step 102, DETECT TRAFFIC-STATE, includes detecting, with a detector 18, a traffic-state 20 proximate to a host-vehicle 12 where the traffic-state 20 is characterized as inhibiting traffic-flow 14 as described above. The detector 18 may detect at least one vehicle stopped at a traffic-signal 22, where the traffic-signal 22 is configured to control traffic-flow 14 through an intersection.

Step 104, DETERMINE TRAFFIC-STATE, includes determining that the traffic-state 20 has occurred, with a first-controller-circuit 24 configured to communicate with the detector 18 and the traffic-signal 22.

Step 106, SEND REQUEST, includes sending a request 32, with the first-controller-circuit 24, to the traffic-signal 22 to operate to a signal-state 34 that changes the traffic-state 20. In accordance with the detection of the at least one vehicle stopped at the traffic-signal 22 the first-controller-circuit 24 may request 32 to operate the traffic-signal 22 in a proceed-state 36 until the at least one vehicle proceeds through the intersection.

Step 108, DETERMINE DRIVING MANEUVER EXECUTION, includes determining, with a third-controller-circuit 44 in communication with the first-controller-circuit 24, whether a particular driving-maneuver may be completed without colliding with or impeding other traffic. The particular driving maneuvers include, but are not limited to, a left-hand-turn maneuver 38 and a pass-through maneuver 42.

Step 110, STEER HOST-VEHICLE, includes steering the host-vehicle 12, with a second-controller-circuit 40 in communication with the first-controller-circuit 24, through the intersection in accordance with the determination by the third-controller-circuit 44 that the particular driving maneuver can be completed without colliding with or impeding other traffic.

Accordingly, a traffic control system 10 (the system 10), controller-circuits, and a method 100 of operating the system 10 are provided. The system 10 is an improvement over other traffic control systems because the system 10 changes the traffic-state 20, which may improve overall traffic-flow 14 on a roadway 16.

While this invention has been described in terms of the preferred embodiments thereof, it is not intended to be so limited, but rather only to the extent set forth in the claims that follow. Moreover, the use of the terms first, second, etc. does not denote any order of importance or operation, but rather the terms first, second, etc. are used to distinguish one element from another. Furthermore, the use of the terms a, an, etc. do not denote a limitation of quantity, but rather denote the presence of at least one of the referenced items. Additionally, directional terms such as upper, lower, etc. do not denote any particular orientation, but rather the terms upper, lower, etc. are used to distinguish one element from another and locational establish a relationship between the various elements.

We claim:

1. A traffic control system, comprising:
   a detector configured to detect a traffic-state proximate to a host-vehicle, said traffic-state characterized as inhibiting traffic-flow; and
   a first-controller-circuit configured to communicate with the detector and a traffic-signal, said traffic-signal configured to control traffic-flow through an intersection, wherein the first-controller-circuit sends a request to the traffic-signal to operate to a signal-state that changes the traffic-state, wherein the detector detects at least one vehicle stopped at the traffic-signal, in accordance with the detection of the at least one vehicle stopped at the traffic-signal the first-controller-circuit sending the request to operate the traffic-signal in a proceed-state until the at least one vehicle proceeds through the intersection.

2. The traffic control system in accordance with claim 1, further comprising a second-controller-circuit steering the host-vehicle, wherein the at least one vehicle includes the host-vehicle.

3. The traffic control system in accordance with claim 1, wherein the detector detects at least one vehicle approaching the traffic-signal, in accordance with the detection of the at least one vehicle approaching the traffic-signal the first-controller-circuit sending the request to operate the traffic-signal in a proceed-state until the at least one vehicle proceeds through the intersection.

4. The traffic control system in accordance with claim 3, further comprising a second-controller-circuit steering the host-vehicle, wherein the at least one vehicle includes the host-vehicle.

5. The traffic control system in accordance with claim 1, wherein:
   the first-controller-circuit determines whether the traffic-signal indicates a stop-state;
   a third-controller-circuit determines whether a left-hand-turn maneuver can be completed without colliding with or impeding other traffic; and
   in accordance with the determination by the third-controller-circuit that the left-hand-turn maneuver can be completed without colliding with or impeding other traffic, a second-controller-circuit steering the host-vehicle executing the left-hand-turn maneuver through the intersection.

6. The traffic control system in accordance with claim 1, wherein:
   the first-controller-circuit determines whether the traffic-signal indicates a stop-state;
   a third-controller-circuit determines whether a pass-through maneuver can be completed without colliding with or impeding other traffic; and
   in accordance with the determination by the third-controller-circuit that the pass-through maneuver can be completed without colliding with or impeding other traffic, a second-controller-circuit steering the host-vehicle executing the pass-through maneuver through the intersection.

7. A traffic control method, comprising:
   detecting, with a detector, a traffic-state proximate to a host-vehicle, said traffic-state characterized as inhibiting traffic-flow; and
   requesting, with a first-controller-circuit configured to communicate with the detector and a traffic-signal, said traffic-signal configured to control traffic-flow through an intersection, the traffic-signal to operate to a signal-state that changes the traffic-state, wherein the detector detects at least one vehicle stopped at the traffic-signal, in accordance with the detection of the at least one vehicle stopped at the traffic-signal the first-controller-circuit sending the request to operate the traffic-signal in a proceed-state until the at least one vehicle proceeds through the intersection.

8. The traffic control method in accordance with claim 7, further comprising a second-controller-circuit steering the host-vehicle, wherein the at least one vehicle includes the host-vehicle.

9. The traffic control method in accordance with claim 7, wherein the detector detects at least one vehicle approaching the traffic-signal, in accordance with the detection of the at least one vehicle approaching the traffic-signal the first-controller-circuit sending the request to operate the traffic-signal in a proceed-state until the at least one vehicle proceeds through the intersection.

10. The traffic control method in accordance with claim 9, further comprising a second-controller-circuit steering the host-vehicle, wherein the at least one vehicle includes the host-vehicle.

11. The traffic control method in accordance with claim 7, wherein:
   the first-controller-circuit determines whether the traffic-signal indicates a stop-state;
   a third-controller-circuit determines whether a left-hand-turn maneuver can be completed without colliding with or impeding other traffic; and
   in accordance with the determination by the third-controller-circuit that the left-hand-turn maneuver can be completed without colliding with or impeding other traffic, a second-controller-circuit steering the host-vehicle executing the left-hand-turn maneuver through the intersection.

12. The traffic control method in accordance with claim 7, wherein:
   the first-controller-circuit determines whether the traffic-signal indicates a stop-state;
   a third-controller-circuit determines whether a pass-through maneuver can be completed without colliding with or impeding other traffic; and
   in accordance with the determination by the third-controller-circuit that the pass-through maneuver can be completed without colliding with or impeding other traffic, a second-controller-circuit steering the host-vehicle executing the pass-through maneuver through the intersection.

* * * * *